United States Patent [19]

Clymer

[11] Patent Number: 4,664,327

[45] Date of Patent: May 12, 1987

[54] REEL HUB LATCH

[75] Inventor: Jack W. Clymer, Tulsa, Okla.

[73] Assignee: Telex Computer Products, Inc., Tulsa, Okla.

[21] Appl. No.: 775,677

[22] Filed: Sep. 13, 1985

[51] Int. Cl.⁴ .......................................... B05H 17/02
[52] U.S. Cl. ................................. 242/68.3; 242/68.2; 242/72 R
[58] Field of Search ..................... 242/72 R, 68.2, 68.3

[56] References Cited

U.S. PATENT DOCUMENTS

| | | | |
|---|---|---|---|
| 3,108,757 | 10/1963 | Williams et al. | 242/68.2 X |
| 3,510,082 | 5/1970 | Sexton et al. | 242/68.2 |
| 3,544,027 | 12/1970 | Green et al. | 242/68.3 |
| 3,774,921 | 11/1973 | Gifford | 242/72 R X |

Primary Examiner—Stuart S. Levy
Assistant Examiner—Thomas R. Hannon
Attorney, Agent, or Firm—Head Johnson Stevenson

[57] ABSTRACT

A reel hub latch for use in holding rotating devices, such as a reel of tape, rigidly and concentrically to a rotating shaft, in which a seating surface is provided for the reel on the outside surface of a first or hub portion of the device. There is an annular channel in the outer surface of the hub in which is provided a ring of deformable material, which has two parallel faces perpendicular to the axis of the ring. These two surfaces are provided with shallow narrow ridges molded into the material which are equally spaced around the circumference of the ring. The walls of the annular channel are likewise provided with an equal plurality of shallow narrow grooves in the parallel facing walls of the channel. A segmented disk is provided in the hub to extrude the deformable material outwardly with the movement of the handle, and to withdraw the ring material into the channel when the handle is moved in the reverse direction. The purpose of the ridges and grooves is to insure that the ring of deformable material does not rotate around the axis of the hub when there is a high torque between the rotating hub and the tape reel.

3 Claims, 5 Drawing Figures

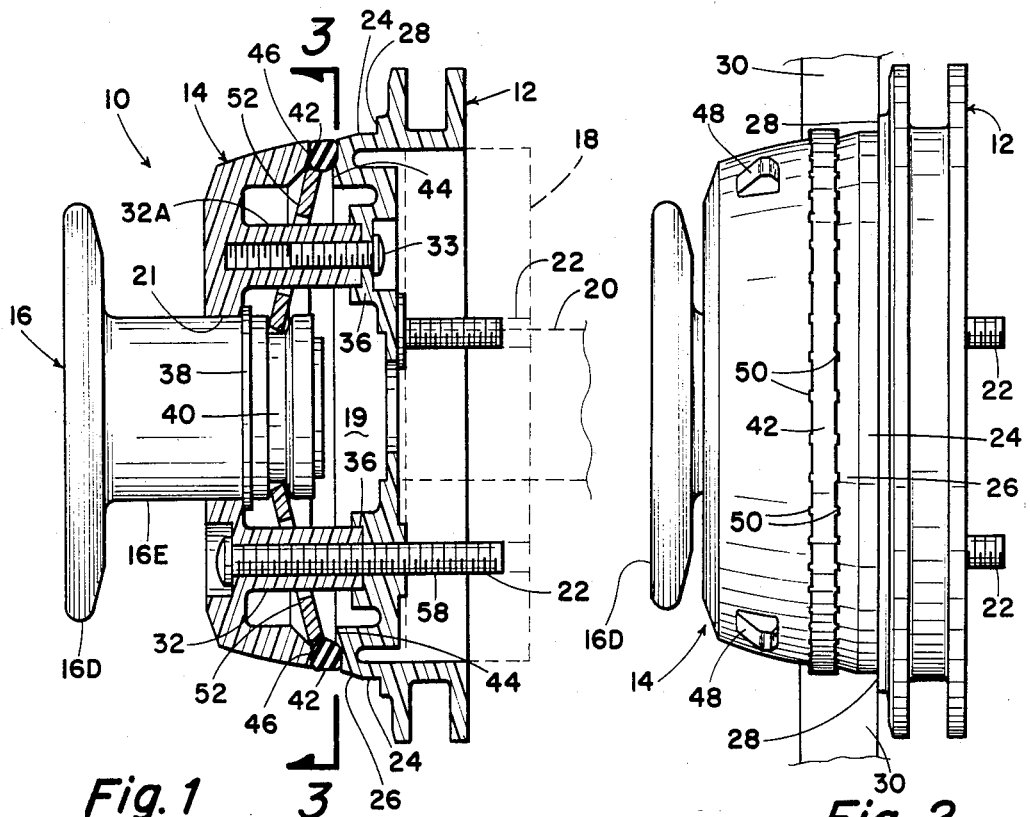
Fig. 1
Fig. 2
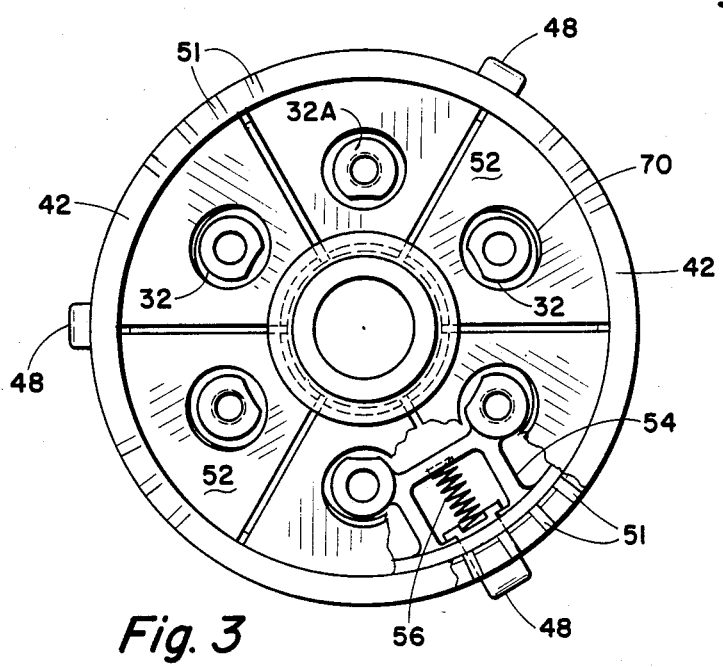
Fig. 3

4,664,327

REEL HUB LATCH

CROSS-REFERENCE TO RELATED PATENT

This application is related to U.S. Pat. No. 3,544,027, issued to Joe William Greene el al on Dec. 1, 1970. U.S. Pat. No. 3,544,027 is included by reference into this application.

BACKGROUND OF THE INVENTION

1. Field of the Invention

This invention lies in the field of tape reels and drives such as for the computer industry, etc. More particularly, it concerns the design of a hub which can be removably attached rigidly to the end of a rotating shaft and provides for mounting of a reel of tape, or the like, on the circumferential surface of the hub with means in the hub to securely lock the reel against relative rotation of the reel with respect to the hub.

2. Description of the Prior Art

This invention is related to the U.S. Pat. No. 3,554,027, of Joe William Green el al, which has been entered by reference into this application. This patent represents the closest prior art known to the inventor. However, this invention has one important novel improvement over that of the Greene patent.

The Greene patent has a two-piece hub which is removably attachable to a rotating shaft. The outside circumferential surface of the hub matches that of the internal circumferential surface of the reel. As shown in the Greene patent, there is an O-ring or similar ring of compliant material that is nested into an annular channel around the hub. This channel provides an opening between the outside and an internal cavity in the hub. By careful construction the annular channel has two parallel faces which are perpendicular to the axis of the hub. Also, the spacing between those surfaces is maintained quite accurately by means of design of the hub portion and the cover portion which are held together by screws.

A toggle means is provided in the hub. By operation of an axial spindle in and out of the cover will extrude the O-ring to tighten against, and apply pressure to the internal surface of the reel, or when the spindle is withdrawn to cause the ring to be drawn into the channel. This frees the reel from the compressive force of the ring against the internal surface of the reel.

However, it has been found that in spite of this extrusion and withdrawal of the ring, out of and into the annular channel, that the ring, while exerting a radial outward pressure against the reel permits the reel to slip rotatably around the surface of the hub. This had lead to erratic and unpredictable performance in tape systems.

This invention is designed with a precise and positive means to prevent this relative rotation of the ring and thus relative rotation of the reel about the circumferential surface of the hub. The improved hub of this invention grips the reel so effectively that the thorough cleaning and maintenance required for the previously used hub has been substantially reduced.

SUMMARY OF THE INVENTION

It is a primary object of this invention to provide a latched hub for rigidly and removably holding a reel to the circumferential surface of the hub, mounted on a rotatable shaft.

It is a further object of this invention to provide a positive means for prevention of rotation of a deformable ring positioned inside of an annular channel, and which is extruded outwardly, radially, against the inner surface of the tape reel, so as to prevent relative rotation of the reel and the hub under high accelerations of the rotating shaft.

These and other objects are realized and the limitations of the prior art are overcome in this invention by providing a two piece hub latch. One part, the hub, is removably fastened to the rotating shaft and the other part, which is a cover, which is attached coaxially with the hub in such a way that the spacing between them is exact, and there is an annular channel in the outer circumferential surface of the hub. This channel also communicates with the interior cavity of the hub and cover.

A compliant ring is fitted into this annular channel and by means of toggle means inside the cavity of the hub, operable by a spindle that projects outwardly through the cover of the hub, the ring can be extruded radially outwardly or inwardly by moving the spindle and toggle in or out, etc.

The ring is of special and novel design in that it has basically two parallel surfaces perpendicular to the axis of the ring and precisely spaced. The ring is molded of a compliant material such as might be used for O-rings and the like. On the top and bottom surfaces of the ring are provided shallow narrow ridges, which extend radially along the annular surfaces of the ring, and are equally spaced about the circumference of the ring.

The two parallel facing surfaces of the channel in the hub likewise are provided with shallow narrow radial grooves, into which the ridges on the ring will fit. This provides a restraint on the ring, so that it cannot move rotationally about the axis of the hub, inside of the annular channel.

BRIEF DESCRIPTION OF THE DRAWINGS

These and other objects and advantages of this invention and a better understanding of the principles and details of the invention will be evident from the following description, taken in conjunction with the appended drawings, in which:

FIG. 1 illustrates in diametral cross-sectional one embodiment of this invention.

FIG. 2 illustrates the same embodiment as an elevational exterior view of the device.

FIG. 3 illustrates a view taken along the plane 3—3 of FIG. 1.

DESCRIPTION OF THE PREFERRED EMBODIMENT

Figure 4:
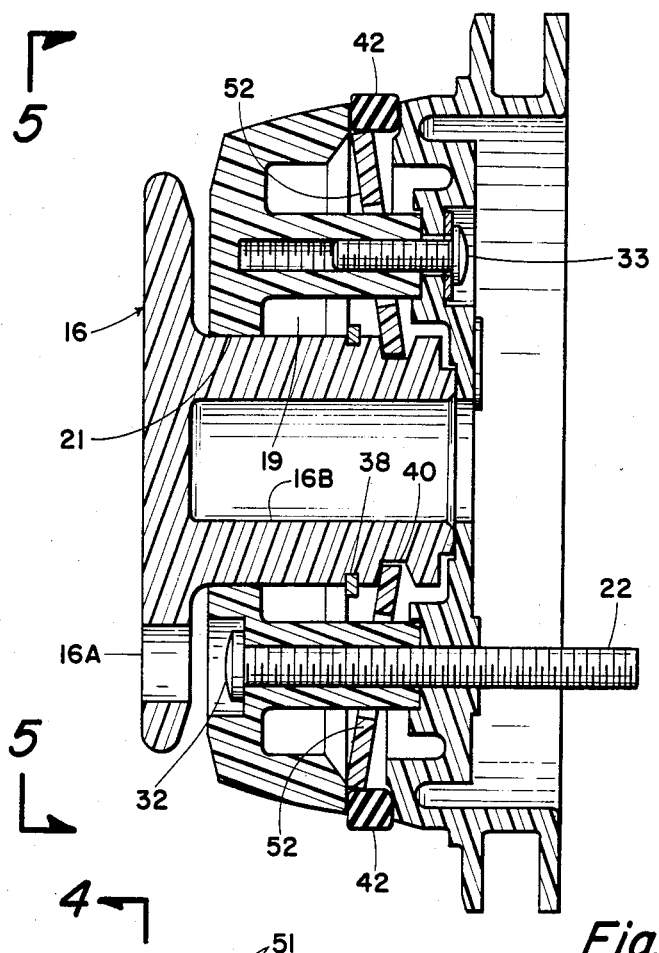
FIG. 4 is another view in cross-section of the embodiment of FIG. 1 taken along the plane 4—4 of FIG. 5.

Before explaining in detail the present invention, it is to be understood that the invention is not limited in its application to details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Referring now to the drawings and in particular to FIGS. 1, 2 and 3, there are shown several views of the device of this invention. The entire device is indicated generally by the numeral 10 and is made up of two principal portions, a hub, indicated generally by the numeral 12 and a cover, indicated generally by the numeral 14.

The two parts, the hub and the cover, are held together by screws 33. The two parts, the base or hub, and the cover, are coaxial and have two outer surfaces which are continuations of one another, except that there is an annular groove or channel, with one wall 46 of the cover and the second wall 44 of the hub. A ring 42 of compliant material is shown in position in the channel between the hub and the cover. This channel provides an open passage into the cavity 19 inside of the hub and cover.

A plurality of circular segments of a stiff segmented disk 52 of plastic or metal, of a selected outer diameter, inner diameter, and included angle. There is a circular cylindrical opening 21 in the front face of the cover 14, into which a cylindrical spindle 16 can slide freely in an axial direction. The spindle has a handle 16D by which it can be pushed into the cavity of the hub, or partially withdrawn from the cavity of the hub.

There is a narrow annular channel around the cylindrical portion of the spindle which provides a position for a spring locking ring 38, that will limit the outer travel of the spindle, so that it will always be penetrating the opening 21 in the cover. There is also another annular channel 40 of a width slightly greater than the thickness of the segmented disk 52. There may be any number of these segments which can be separate segments, or can be loosely held together so as to constitute a full 360 degrees.

In the drawing there are shown a plurality of bosses or columns 32A and the circular disc 52 is shown to be broken up into six equal segments, each one having a large opening such as can be loosely fitted over the hubs one sector or each boss. The narrow portion of the sector is cut off with a circular radius substantially that of the channel 40 so that the plurality of segments will fit comfortably around the circumference of the interior of the channel 40 and will rest at their outer ends against the inner wall of the ring 42.

FIG. 3 which is a view taken across the plane 3—3 of FIG. 1, will illustrate how the plural sectors 52 fit between the channel 40 and the internal surface of the ring 42.

The tops of the bosses are precisely at a certain dimension from the surface 46 of the annular channel of the cover and the hub has a corresponding surface 44 with the surfaces plane and parallel, and precisely spaced apart. The hub and the cover are held together by screws 33. With the two parts held tightly together and spacing between the surfaces 46, 44 or the width of the channel for the ring will be a precise distance. The dashed lines 18 and 20 illustrate a possible construction of the shaft 20 and cylinder 18 mounted on the end of the shaft 20. The hub of the latching device for the reel, has a re-entrant cylindrical portion which can be slipped over the cylinder 18 and be held to it by screws 58 extending through the bosses and threaded openings 22 into the cylinder 18 with the screws available through openings 16A in the handle 16D of the spindle 16, as shown in FIGS. 4 and 5.

In FIG. 2 the walls of the channel which contains the ring 42 are shown with notches 50 matching the surfaces and corresponding ridges 51 molded into the ring, as in FIG. 3.

Figure 5:
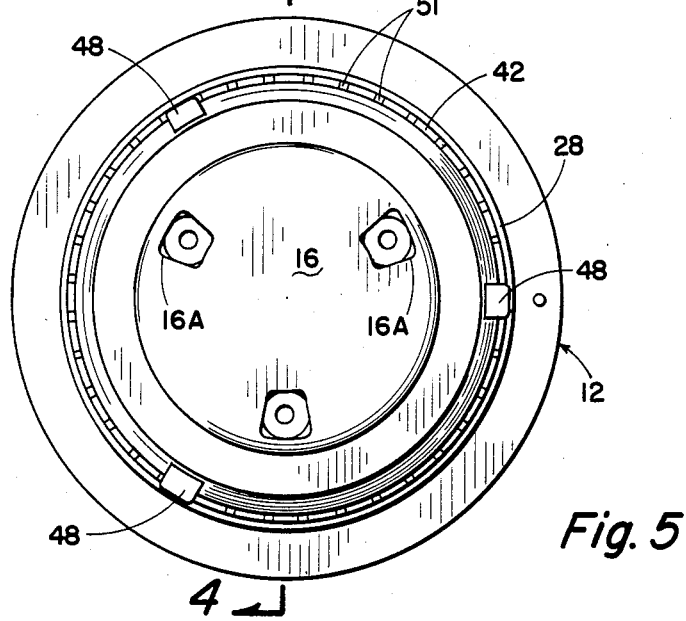
FIG. 5 is a view taken along the plane 5—5 of FIG. 4.

Referring now to FIG. 4, as well as FIGS. 1 and 3, the spindle 16 has been pushed into the cavity 19 of the hub. The segments 52 are held in position by the bosses 32 in the openings 70 in the segments. They are seated in the channel 40 of the spindle, and move inwardly with the spindle. Although the outer circular surfaces of the segments 52 are still positioned against the internal surface of the ring 42, it will be seen that because of the difference in positions of the segments with respect to the plane of the ring, the ring can be drawn inside the channel as in FIG. 1 when the handle of the spindle is withdrawn, while in the position shown in FIG. 4 the segments are more nearly in the plane of the ring. Therefore they extend radially outwardly from the spindle by an increased small dimension which forces the ring 42 to move out and extend beyond the circumferential surfaces 24, 26 of the hub. Thus, by pushing the spindle into the hub the ring is extruded outwardly of the channel to press tightly against the inner surface of the reel, which would be positioned as shown in FIG. 2, being outside of the surface of the hub 24 and tightly against the transverse wall 28 which positions the reel in proper location so that the tape can be threaded on and off from the reel.

There are a number of little fingers 48 of FIG. 3 which extend outside of the surface of the cover and are backed by springs 56, held in a frame 54, so that they can be moved inwardly with minor force. These are for the purpose of centralizing the reel as it is pressed over the hub and on to the holding surface of the hub.

FIG. 5 is a view taken along the plane 5—5 of FIG. 4 and clearly shows the opening 16A through which the screws 58 can be inserted and screwed into the threaded openings 22 inside of the cylinder 18 attached to the end of the drive shaft 20.

All of the views have the same number indicating the same part so that further detail of the drawings would not be necessary.

The design of this improved hub for holding a reel of tape, for example, rigidly and concentrically on a rotating shaft, without slippage, with respect to the hub of this device, is similar in many respects to the prior art and form no part of the invention.

The invention lies primarily in the design of the ring and the matching surfaces of the annular channel in the hub. This provides adequate force between the ring and the internal surface of the reel and prevents rotational slipping between the hub and the reel of tape because of the intense pressure of the deformable material of the ring as it is extruded outwardly of the channel to hold tightly against the inner surface of the reel. While the ridges are shown on the ring, with corresponding grooves on the hub surfaces, the invention will work equally well if the grooves are on the ring and the ridges are on the hub surfaces. The ridges and grooves can be of any desired cross-section, such as triangular, rectangular, circular, etc.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a device for attaching a rotatable member having an internal surface of a fixed selected diameter to a rotatable shaft, comprising:
   (a) a body comprising two parts, the first part being a hub with means to rigidly fasten said hub to said shaft, said hub having a radial flange and a circumferential seating surface adapted to provide an index for positioning said member to said hub, circumferentially and longitudinally;
   (b) the second part of said body being a cover, attachable to said hub by means of a plurality of positioning bosses and screws, both said hub and said cover having outer facing surfaces in planes perpendicular to the axis of said hub and said shaft, said surfaces forming an annular channel with parallel walls of a selected spacing and radial width;
   (c) a circular ring of deformable material of such dimension as to fit snugly inside said annular channel;
   (d) said front cover having a cylindrical axial opening of selected diameter, and a spindle with handle adapted to slide inside said opening;
   (e) toggle means interacting between said spindle and said ring, whereby when said spindle is drawn outwardly, said ring will move radially inwardly into said channel, and when said spindle is pushed inwardly, said ring will be partially extruded out of said channel;
   the improvement in said device comprising:
   (f) said ring having a top and a bottom surface which are substantially plane and parallel, and their plane is perpendicular to the axis of said ring;
   (g) said surfaces having a plurality of (R) equally spaced, shallow, narrow, radial ridges or grooves extending outwardly from said plane surfaces on top and bottom; and
   (h) said plane parallel surfaces of said hub and said cover, both having a plurality of (R) equally spaced shallow narrow grooves or ridges to match the narrow radial ridges or grooves on said ring, said ring being free to expand outwardly and contract inwardly, the ridges or grooves on said ring sliding in said grooves or ridges in said hub and cover,
   whereby with said ridges locked into said grooves, said ring will be locked to said hub so as to prevent angular motion of said ring with respect to said hub, in said channel in said hub.

2. The apparatus as in claim 1 in which said ridges are on said ring and said grooves are on said surfaces.

3. The apparatus as in claim 1 in which said ridges are on said surfaces and said grooves are on said ring.